May 15, 1956  J. T. ESKRIDGE  2,745,236
MACHINE FOR CLEARING LAND OF SAGEBRUSH AND THE LIKE
Filed March 13, 1952  4 Sheets-Sheet 1

Inventor
JAMES T. ESKRIDGE
By WHITEHEAD & VOGL
PER *Earle Whitehead*
Attorneys

May 15, 1956  J. T. ESKRIDGE  2,745,236
MACHINE FOR CLEARING LAND OF SAGEBRUSH AND THE LIKE
Filed March 13, 1952  4 Sheets-Sheet 2
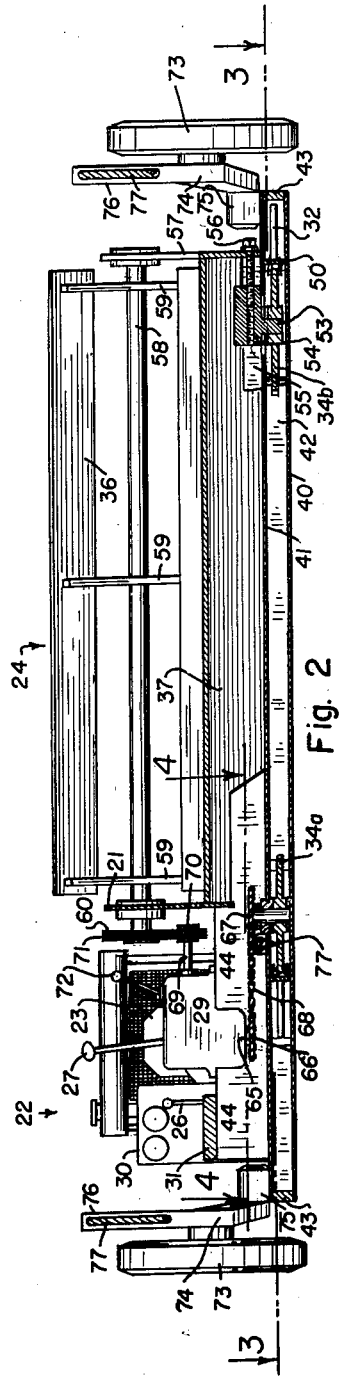
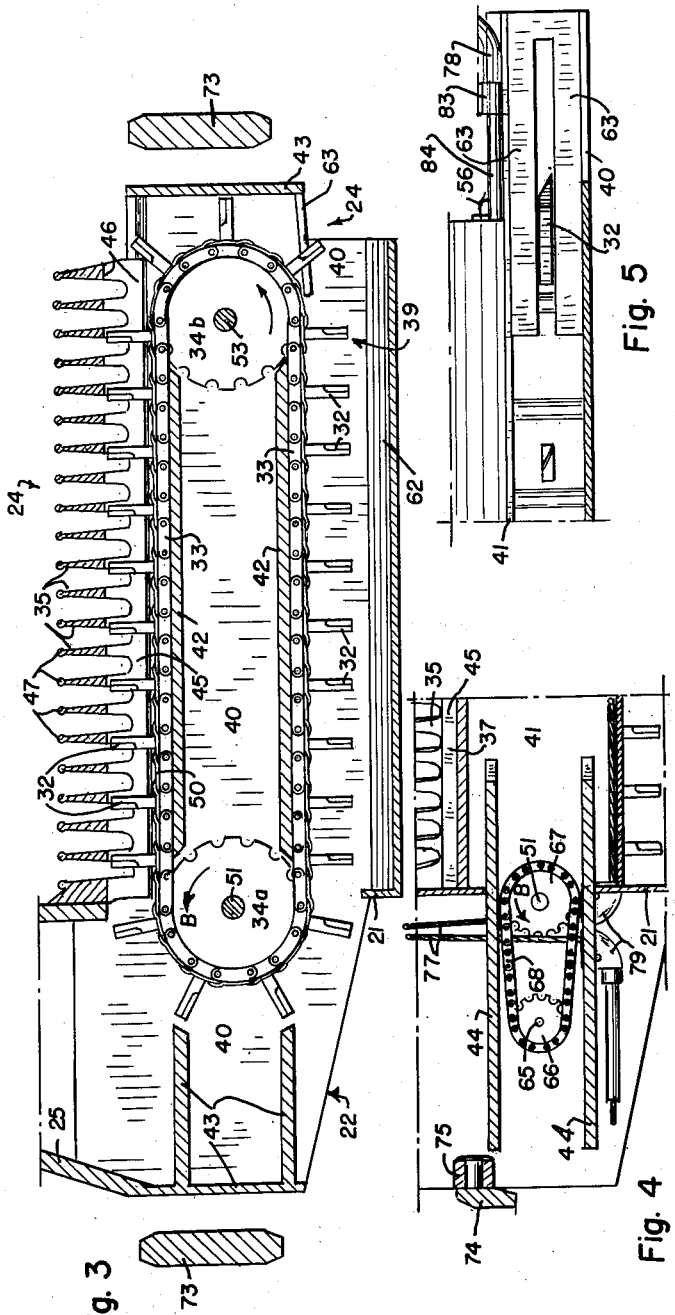
Inventor
JAMES T. ESKRIDGE
By  WHITEHEAD & VOGL
PER  *Earle Whitehead*
Attorneys May 15, 1956  J. T. ESKRIDGE  2,745,236
MACHINE FOR CLEARING LAND OF SAGEBRUSH AND THE LIKE
Filed March 13, 1952  4 Sheets-Sheet 3

Inventor
JAMES T. ESKRIDGE
By WHITEHEAD & VOGL
PER *Earle Whitehead*
Attorneys

May 15, 1956  J. T. ESKRIDGE  2,745,236
MACHINE FOR CLEARING LAND OF SAGEBRUSH AND THE LIKE
Filed March 13, 1952  4 Sheets-Sheet 4
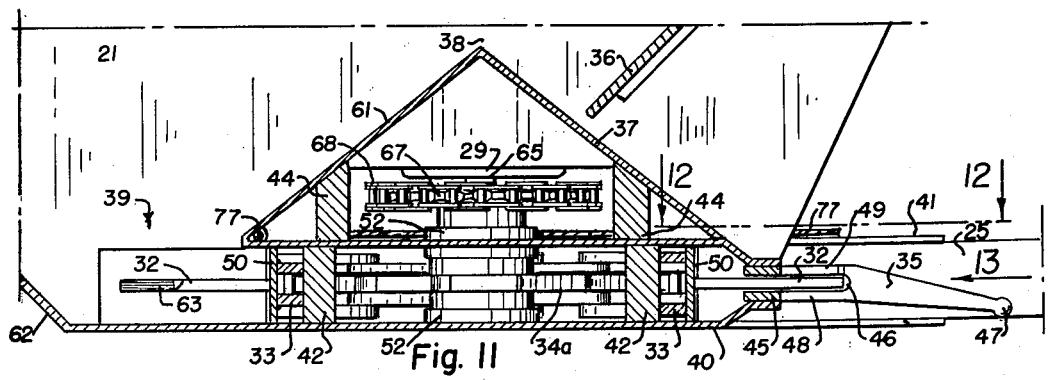
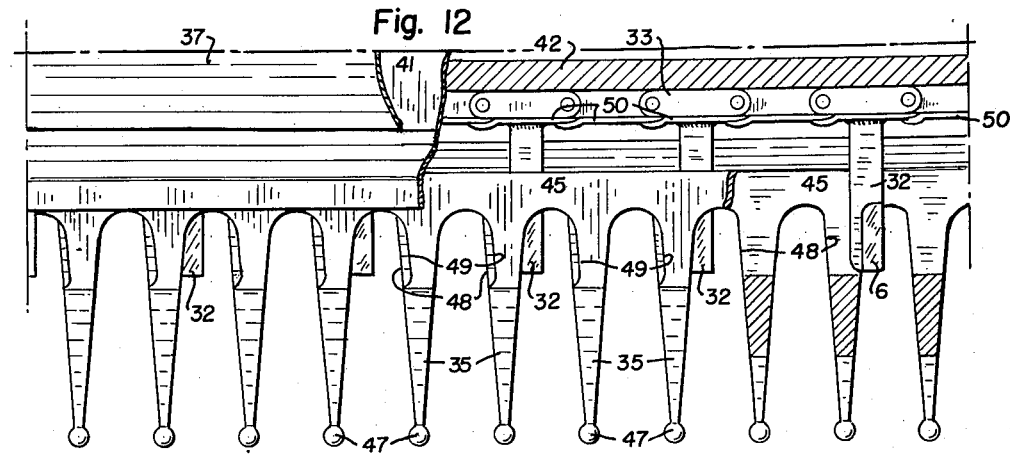
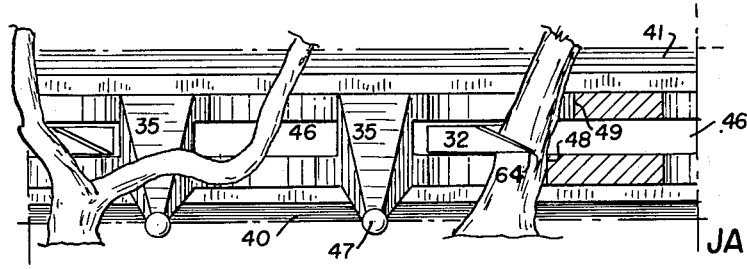
Inventor
JAMES T. ESKRIDGE
By WHITEHEAD & VOGL
PER *Earle Whitehead*
Attorneys

United States Patent Office 2,745,236
Patented May 15, 1956

2,745,236

MACHINE FOR CLEARING LAND OF SAGEBRUSH AND THE LIKE

James T. Eskridge, Craig, Colo.; Wilma C. Eskridge, administratrix of said James T. Eskridge, deceased Application March 13, 1952, Serial No. 276,247

2 Claims. (Cl. 56—23)

This invention relates to apparatus which is adapted to clear land of heavy growths of sagebrush, mesquite and the like, and especially for the clearing of the brushy but treeless flat lands in the arid Western States, and to thereby facilitate the reclamation of such waste lands. The primary object of the invention is to provide a new and improved apparatus for clearing land of plant growth having the proportions of large shrubs and small trees, whose stems and branches are too heavy for clearing with conventional plows, harrows or cutters, and which are too thick in growth to be grubbed out plant by plant.

Other objects of this invention include the provision, in a new and improved land clearing apparatus, of (1) means for cutting a swath through plants such as sage brush and depositing the cut brush in windrows; (2) means for lifting to cutting position the lateral branches of heavily entwined brush which lie upon the ground; (3) means, including improved cutter elements, which are adapted to quickly and easily sever heavy stems of plants, such as sagebrush, and to gather and dispose of the plants without causing a clogging or binding of the machine; (4) means for regulating the height above the ground at which the stems of the brush are cut; (5) means for transferring the brush to the rear of the apparatus as it is cut and to thereby keep the cutting elements free of cut brush; (6) a circulating member including cutting elements which are moved laterally of the machine in one direction at the front of the machine, to serve as cutters, and in the opposite direction at the rear of the machine and there serve to discharge laterally of the machine, the brush which has been cut and moved to the rear of the machine; and (7) means for varying the speed of the cutting and moving elements independently of the speed of movement of the machine.

Yet other objects of this invention are to provide new and improved brush cutting apparatus as a sturdily built and long-lived unit, but which is nevertheless simple in construction, and economical in operation.

With these and other objects in view, all of which more fully hereinafter appear, my invention comprises certain new and novel combinations, constructions and arrangements of elements and parts, as hereinafter described, and as defined in the appended claims, and illustrated, in preferred embodiment, in the drawing in which:

Figure 2 is a sectional elevation as viewed transversely across the apparatus from the indicated line 2—2 at Fig. 1.

Figure 3 is a sectional plan of the apparatus to show the cutting element arrangement, all as viewed from the indicated line 3—3 at Fig. 2.

Figure 4 is a fragmentary sectional plan of the apparatus showing a portion of the driving element arrangement, all as viewed from the indicated line 4—4 at Fig. 2.

Figure 5 is a fragmentary detail, illustrating brush clearing elements, all as viewed from the indicated line 5—5 at Fig. 1, but on an enlarged scale.

Figure 11 is a sectional elevation illustrating a portion of the showing of Fig. 6 on an enlarged scale.

Figure 12 is a fragmentary detail, illustrating the cutting elements, all as viewed substantially from the indicated line 12—12 at Fig. 11, but with portions of the cover plates broken away to show elements otherwise hidden from view.

Figure 13 is a fragmentary detail illustrating, in front elevation, the cutting elements, all as viewed substantially from the indicated arrow 13 at Fig. 11, but with portions of the elements broken away to show elements and constructions otherwise hidden from view.

Figure 14 is a fragmentary portion of the showing at Fig. 13, but on a further enlarged scale, depicting the cutting of the stems of brush and illustrating the manner in which the apparatus cuts the main stem of a bush and lifts lateral branches into position to permit cutting the stem below the branch.

Figures 1, 15:
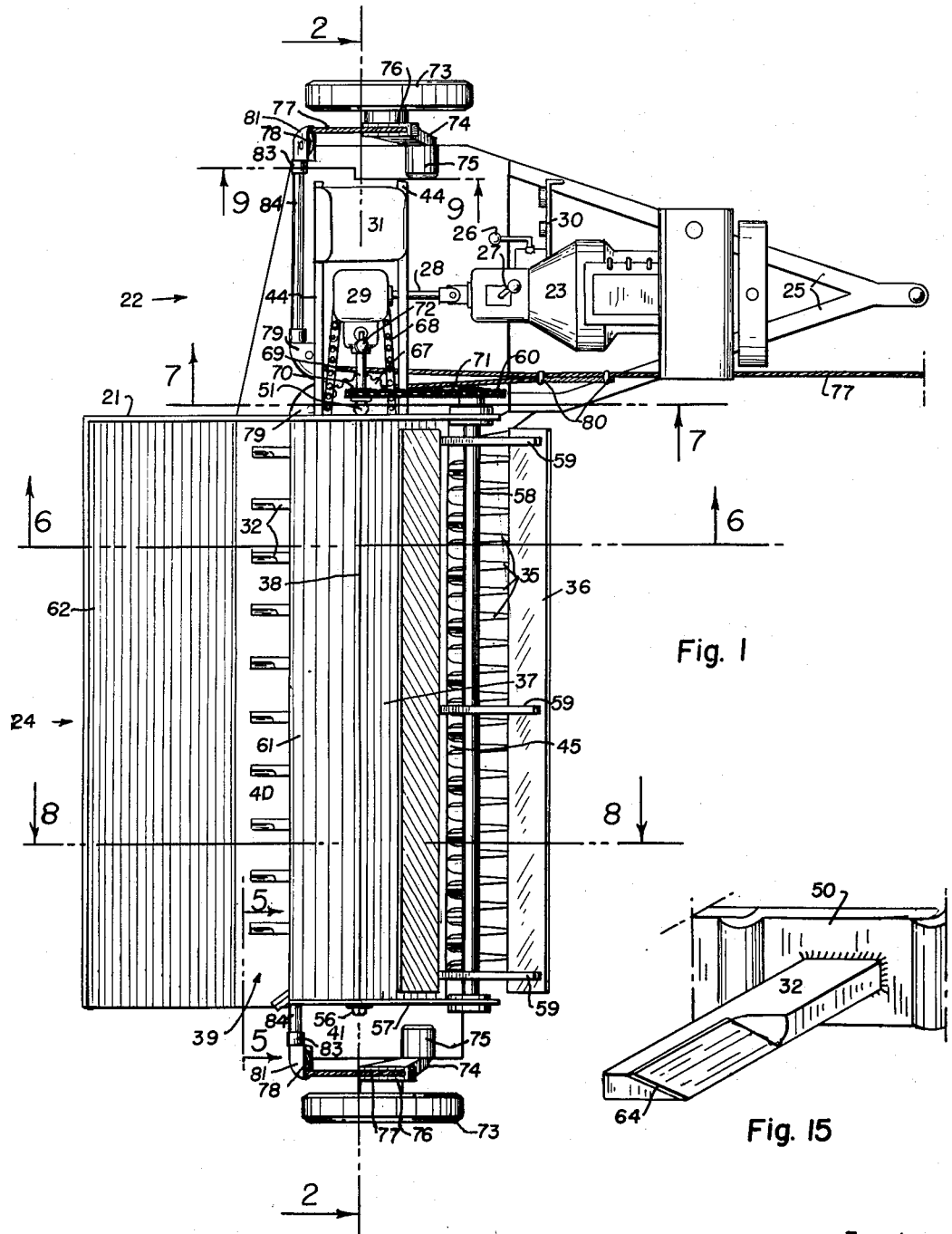
Figure 1 is a plan view of my improved apparatus.
Figure 15 is an isometric view of a single cutter knife illustrating in detail its construction.

There are large tracts of arable land in the western states which are flat, free of stones and fertile, but which have never been cultivated because of the dry climate. Much of this land is overgrown with sagebrush and is generally assumed to be of no value. Admittedly, the rainfall conditions are such that no permanent or long-time crop could possibly be grown in such a country, yet there is often a short period during the winter months when the ground is moistened by snowfall or rain, and during such period short-lived grasses may grow and mature. Sagebrush is often the only perennial growth existing, for it can lie in a dormant or near-dormant state through the greater portion of the year, growing whenever favorable conditions occur. Such growth is often thick, and the sagebrush, attaining the size of large shrubs, prevents growth of other plants. It has been discovered that such sagebrush land is also suitable for raising winter wheat and similar short-lived crops by planting in the fall, the winter rains giving the plants a start, permitting them to mature early in the spring.

As a result, extensive lands in western Colorado, Utah and Nevada are being transformed from a desert of sagebrush to fields wherein winter wheat or pasture grass is grown, it being almost axiomatic that if there is sufficient moisture to support the growth of sagebrush, there will be sufficient moisture to raise at least one crop of wheat each year. However, the clearing of lands of the sagebrush to permit them to be plowed and prepared for a crop such as wheat presents a difficult problem, as conventional machinery, commonly used for preparing land, is not adapted to handle a heavy growth of sagebrush. Moreover, the spherical form of a large sagebrush plant, with laterally spreading base branches several inches in diameter, renders cutting or grubbing of the brush laborious, and the bulk of the plant renders it difficult to pile for burning.

With such problems in view, the present invention was conceived and developed, and comprises, in essence, a new and improved cutting apparatus sufficiently heavy and rugged to cut a swath through a field of sagebrush, to move the cut brush rearwardly from the cutting elements and finally to shift the brush transversely and deposit is in a windrow alongside the path of movement of the apparatus.

In the illustrated embodiment, the machine is depicted as a tractor-drawn, wheel-mounted, unit elongated transversely of the direction of movement and divided into two sections by an upstanding partition wall 21. One section, the control section 22, includes a motor 23, operative controls and other elements, all as hereinafter described. The other or cutting section 24 includes cutting and brush-moving elements hereinafter described. In operation the unit is connected to a tractor by a hitch tongue 25, which comprises two converging beams extending forwardly of the control section 22, and in movement the control section 22 follows the tractor with the cutting section 24 extending to one side to cut a swath alongside the path of and behind the tractor.

The motor 23 may be a conventional gasoline powered unit mounted upon the beams forming the tractor hitch tongue 25, and the operative controls include a clutch 26 and a gear shift 27 to regulate the speed of rotation of the drive shaft 28 of the motor which extends rearwardly from the motor into a gear box 29 wherein it is adapted to drive mechanisms hereinafter described. A control panel 30 and an operator's seat 31 are located in the control section 22 in such manner that an operator may ride upon the unit as it moves.

A series of brush cutting knives 32 is carried upon an endless chain 33 which extends along the cutting section 24 between a pair of sprockets 34a and 34b, mounted within the body, one at each end of the cutting section. The knives outstand from the chain 33 and move across the front of the cutting section toward the control section, successively passing through openings in a series of extending fingers 35. These fingers 35 form a comb which is adapted, upon forward motion of the unit, to project beneath and lift and hold the branches, and any low lying stems, of brush in position for cutting by the knives 32. The cut brush is moved rearwardly by revolving paddles 36 to be pushed up an inclined floor 37 over a triangular ridge having its apex at 38, whence it falls into a trough 39 at the rear of the machine. The knives 32 on the rear reach of the chain 33 extend rearwardly into the trough 39 and move away from the control section toward the outer end of the trough and, in so moving, engage the cut brush in, and move it along and discharge it at the outer end of the trough where, by reason of the forward movement of the machine, it forms a windrow.

The machine is carried on a box-like structure, having a bottom plate 40 and a top plate 41, the chain 33 carrying the cutting knives 32, being mounted for travel between the plates. The plates 40 and 41 are held apart in spaced parallelism by two guide bars 42 and by transverse and longitudinal spacer bars 43 at each end of the plates. The two guide bars 42 lie between the sprockets 34a and 34b, each against the inner side of the chain 33, to hold the reach of the chain between the sprockets in line and to prevent the chain from distortion responsive to pressure exerted upon it. The structural rigidity of the plates 40 and 41 will be sufficient to hold the unit rigid at those portions where the chain and knives swing about the sprockets 34a and 34b between the rearward to the forward side of the machine, where it is impossible to place structural reinforcing members between the plates. However, to obtain complete rigidity at the center of the machine, preferably a pair of reinforcing plates 44 are provided upstanding above the top plate 41 between the control section 22 and the cutting section 24. It is upon these upright plates that the gear box 29 and the seat 31 are mounted.

The bottom and top plates 40 and 41 are brought together at their forward or leading edges, as clearly shown at Fig. 11, and are connected to the comb 45 formed by the series of fingers 35. This comb 45 is a single member including the fingers 35 which extend from a common base connecting them as clearly shown at Fig. 12. A slot 46 extends throughout the base of the comb 45 and extends into a portion of each of the fingers projecting therefrom. The knives 32 travel transversely in this slot 46, and the sides of the fingers 35 next to the base cooperate with the blades of the knives 32 to cut or shear off material which moves into the spaces between the fingers. Each finger 35 is inclined downwardly to position its leading point at substantially the level of the lower plate 40, and the leading point of each finger is terminated by a ball 47 of wear-resistant material. The width of the spaces between the fingers is such that the largest stem of a plant which the machine is capable of cutting will easily move into the space and rearwardly therein to the base of the comb where it will be cut. The cutting of a stem by a knife 32 is accomplished by a shearing action, the knife pushing the stem against the lower edge 48 of the next forward finger 35. The upper edge 49 is offset in the direction of movement of the knives to avoid contact with the stem and prevent binding of the knife as the stem is cut; all as clearly shown at Figs. 12 and 14.

The chain 33 is a conventional heavy-duty tractor chain having protective shields 50 at the outer face of the links. These shields 50 fill the space between the bottom and top plates 40 and 41 to thereby enclose the inner portion of the chain and the sprockets and thereby prevent dust and dirt from accumulating in the chain and sprocket. Each knife 32 is welded onto a shield 50 of the chain to outstand horizontally therefrom in a plane parallel with the planes of the bottom and top plates in a position which will permit them to move in the slot 46 as hereinbefore described.

The sprocket 34a, adjacent the control section 22, drives the chain, and it is mounted upon a drive shaft 51 between bearings 52 mounted in the bottom and top plates 40 and 41. The other sprocket 34b, at the outer edge of the cutting section, is rotatably mounted upon a shaft 53 which depends from an adjusting block 54. The block 54 is slidably carried between two transversely disposed guides 55 on the top plate and is shiftably adjustable by a bolt 56 which extends from the block to a side panel 57 at the outer end of the machine. It follows that wear and tension of the chain may be adjusted through the bolt 56.

Figure 6:
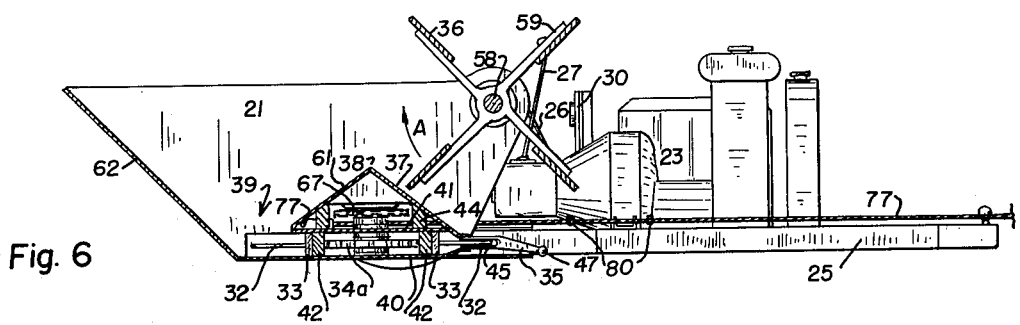
Figure 6 is a sectional elevation as viewed longitudinally across the apparatus from the indicated line 6—6 at Fig. 1.
Figure 7:
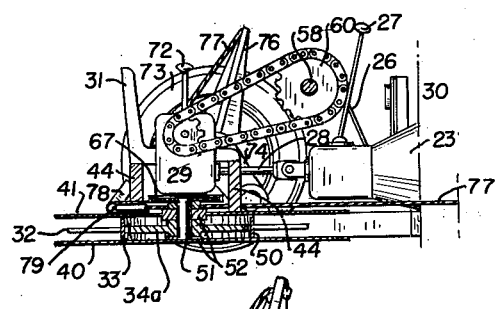
Figure 7 is a portion of a sectional elevation as viewed longitudinally across the apparatus from the indicated line 7—7 at Fig. 1.
Figure 8:
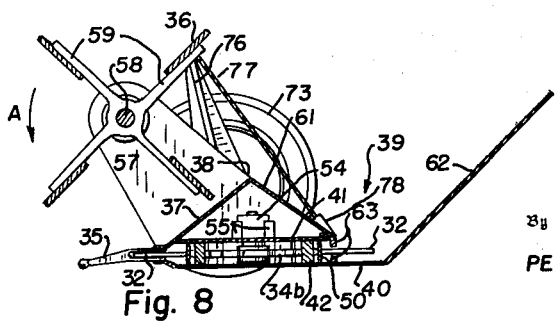
Figure 8 is a sectional elevation as viewed longitudinally across the apparatus from the indicated line 8—8 at Fig. 1.

The paddles 36 comprise four blades rotatably carried upon a shaft 58 which extends transversely across the cutting section 24 above the comb 45, the blades being carried by radial arms 59 extending from the shaft. This paddle assembly is large enough, and is set high enough so that its most forward blade will reach over brush which the machine is cutting and through such overreaching and rotation, as indicated by the arrow A, Figs. 6 and 8, the brush is moved rearwardly, and underneath the paddle assembly, and up the incline 37. The shaft 58 extends through the partition wall 21 and carries a sprocket 60 which is connected to the driving elements in the control section 22, as hereinafter described.

The incline 37 is a plate connected to the forward edge of the top plate 41 and it extends transversely across the cutting section between the partition wall 21 and the side panel 57. The forward side of the trough 39 is defined by a similar plate 61 connected to the plate 37 at the apex 38 of the ridge, thence sloping downwardly and connected to the rear edge of the top plate 41, the plates 37 and 61 thereby forming a triangular cross-sectioned ridge above the top plate 41.

The knives 32 on the chain portion reaching between the sprockets 34a and 34b at the rear side of the sprockets extend rearwardly beyond the rear edge of the top plate 41 to lie in the bottom of the trough 39. The bottom of the trough is defined by the bottom plate 40 which extends underneath and beyond the knives 32. The back of the trough is defined by a sloping backboard 62 connected at its bottom edge to the rear edge of the bottom plate 40 and at one side to the partition wall 21. The other side is unsupported to provide an opening at the side of the machine for the discharge of brush. It follows that brush which falls into the trough will be moved transversely across the machine in the trough by the knives 32, through rotation of the sprockets 34a and 34b in the direction of the indicated arrow B. To free the brush from the knives as they reach the end of the trough and commence to rotate around the sprocket 34b, there is provided a pair of opposing clearing bars 63, one at the top plate 41 and one at the bottom plate 40. These bars are so spaced that only the knives 32 may pass between them, and the angle of the clearing bars 63 with respect to the knives swinging about the sprocket 34b is such that the brush stems caught by the knives during their movement through the trough will slide off the knives.

The knives are simply rectangular bars welded or otherwise connected onto the shields 50 to outstand therefrom as clearly shown at Fig. 15. The blade is at the lower edge of the leading face, being formed by a sloping notch 64 as clearly shown. This blade of the knife cooperates with the lower edges 48 of the fingers 35 to effectuate a single shear cut with the sloping face of the notch 64 lifting the cut stem out of the cutting range. In fast operation, this sloping notch 64 actually causes stems to be thrown out of the spaces between the fingers to allow other stems to enter. In preferred construction the face of the notch 64 is protected by a layer of hardfacing or other protective material.

The operation of both the knives 32 on the chain 33 and the rotation of the paddles 36 is through connections to shafts from the gear box 29. From this gear box there depends a shaft 65 carrying a sprocket 66 in line with a sprocket 67 connected to the drive shaft 51 of the sprocket 34a. The sprockets 66 and 67 are connected by a chain 68 for rotation as indicated by the arrow B, as clearly shown by the Figs. 3 and 4. Another shaft 69 outstands from the gear box 29, and carries a sprocket 70 which is in line with and connected to the sprocket 60 of the shaft 58 by a chain 71 to rotate the paddles 36 as hereinbefore described. There is provided a clutch 72 in the gear box 29 to disconnect the shaft 69, should operation of the cutting knives without operation of the paddles be desirable.

A wheel 73 is mounted at each side of the frame on an offset shaft 74 which is swingably connected to the upper side of the top plate 41 in a journal 75. It follows that swinging of the shaft 74 in the journal 75 shifts the altitudinal position of the wheel with respect to the frame, whereby lowering of the wheel with respect to the frame actually lifts the frame off the ground.

There is an arm 76 upstanding from each offset shaft 74 to which a cable 77 is attached, at the open end. The cable 77 at each wheel is directed rearwardly and downwardly from the arm 76 to a sheave 78 at the rear edge of the top plate 41 and thence toward the center of the machine to be turned again by a sheave 79 to be directed forwardly to the tractor which pulls the machine. It is to be noted that the tractor is not shown or described in the drawing, for it is a conventional element and it is anticipated that the type of a tractor which will be used is of such a character that means, such as a winch, will be provided for extending or withdrawing the cable to raise or lower the unit. It is to be further noted that the cable 77 from each wheel is connected to the other cable in the forwardly extending reach portion as by clips 80. Thus, only one cable needs to extend from the unit to the tractor. It follows that the cutting of brush may be effectuated close to the actual ground surface, or the apparatus may be raised above the ground a reasonable distance to cut brush at any height desired or to move it across the country.

Figure 9:
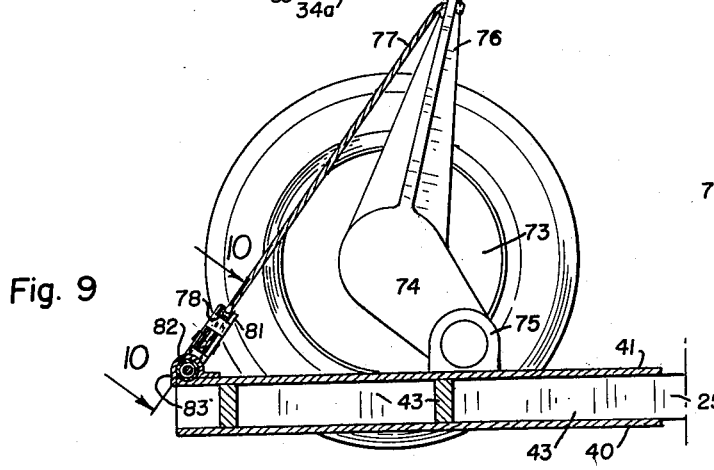
Figure 9 is a fragmentary sectional elevation illustrating wheel mounting elements, all as viewed from the indicated line 9—9 at Fig. 1, but on an enlarged scale.
Figure 10:
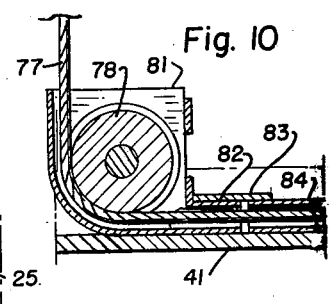
Figure 10 is a fragmentary sectional detail viewed from the indicated line 10—10 at Fig. 9, but on a further enlarged scale.

The sheave 78 is mounted in a block 81 which has a stub 82 projecting from one side whereby it is swingably mounted upon the end plate 41 by a journal clip 83 to permit it to be aligned with the arm 76 regardless of the position of the arm, all as clearly shown at Figs. 9 and 10. The cable extending transversely from this sheave 78 to the sheave 79 is carried inside a pipe 84 except for that portion of the cable in the cutting section which is underneath the inclined plate 61, which portion is adequately shielded by the plates 41 and 61.

The operation of the machine is obvious from the foregoing description. The unit is connected to a tractor by the hitch tongue 25, and the cable 77 is also connected to a winch or drum at the tractor. For moving to a field, the cable 77 is drawn toward the tractor and the unit is raised above the ground. When clearing operations are started in a sagebrush field, the cable 77 is released sufficiently to permit the cutting unit to be lowered to the ground to any desired height, and the motor 23 is started. A desired speed of the knives 32 is obtained by regulation of the gear shift 27. Rotation of the paddles 36 is then started by setting the clutch 72 so as to engage the shaft 69 with the gear box 29 drive elements. The unit is then pulled forwardly by the tractor to cut a swath of sagebrush and pile the brush as a windrow at the side of the swath. The power and speed of the cutter knives will depend upon the size, toughness and density of the brush and this may be easily regulated by the various controls in the apparatus.

I have herein described the construction and operation of a preferred embodiment of my invention. Alternatives and equivalents will occur to those skilled in the art without departure from the scope and spirit of my invention and hence it is to be understood that I am to be limited in my protection not to details illustrated and described, but only by the proper scope of the appended claims.

I claim:

1. In a machine for cutting brush along a path and forming a windrow of cut brush alongside said path and having an endless chain of cutting elements and means to move said machine along said path and means to move said chain transversely of the path, along the front of the machine in one direction and along a rearward portion of the machine in the opposite direction, the combination therewith of a row of fingers along the front of the machine adapted to cooperate with said cutting elements to cut brush, a trough in the rearward portion of said machine aligned with, and along which, said rearward portion of said chain moves, said trough being open at its end toward which said rear portion of said chain moves and means for moving cut brush from the front of the machine into said trough, said cutting elements being adapted to engage brush deposited in said trough and move the same to and through said open end.

2. In the machine defined in claim 1, an element upstanding between the forward and rearward reaches of said chain, approximately the length of said reaches and approximately A-shaped in cross section, its rear side forming the forward wall of said trough, and means for moving cut brush over the top of said element.

References Cited in the file of this patent

UNITED STATES PATENTS

| | | |
|---|---|---|
| 47,351 | Wieland | Apr. 18, 1865 |
| 369,096 | Brown | Aug. 30, 1887 |
| 395,493 | Hanson | Jan. 1, 1889 |
| 492,322 | Brown | Feb. 21, 1893 |
| 779,994 | Downing | Jan. 10, 1905 |
| 2,543,386 | Templeton | Feb. 27, 1951 |